US008437896B2

(12) United States Patent
Kaita et al.

(10) Patent No.: US 8,437,896 B2
(45) Date of Patent: May 7, 2013

(54) HYBRID CAR CONTROL DEVICE, CONTROL METHOD AND RECORDING MEDIUM FOR RECORDING PROGRAM TO PUT THE CONTROL METHOD INTO PRACTICE

(75) Inventors: Keiji Kaita, Nishikamo-gun (JP); Shinobu Nishiyama, Toyoake (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 468 days.

(21) Appl. No.: 12/310,783

(22) PCT Filed: Aug. 27, 2007

(86) PCT No.: PCT/JP2007/067090
§ 371 (c)(1),
(2), (4) Date: Mar. 6, 2009

(87) PCT Pub. No.: WO2008/044401
PCT Pub. Date: Apr. 17, 2008

(65) Prior Publication Data
US 2010/0087973 A1    Apr. 8, 2010

(30) Foreign Application Priority Data
Oct. 6, 2006    (JP) .................. 2006-274950

(51) Int. Cl.
*B60L 9/00*    (2006.01)
(52) U.S. Cl.
USPC .......................................................... 701/22

(58) Field of Classification Search ........................ None
See application file for complete search history.

(56) References Cited

U.S. PATENT DOCUMENTS

| | | | |
|---|---|---|---|
| 7,846,060 B2 * | 12/2010 | Kanayama et al. | 477/3 |
| 2003/0122512 A1 * | 7/2003 | Auerbach | 318/139 |
| 2004/0206610 A1 * | 10/2004 | Hasegawa et al. | 200/10 |
| 2007/0173370 A1 * | 7/2007 | Kanayama et al. | 477/3 |
| 2007/0186573 A1 * | 8/2007 | Ziehr et al. | 62/236 |
| 2007/0275819 A1 * | 11/2007 | Hirata | 477/5 |
| 2007/0292724 A1 * | 12/2007 | Gilchrist | 429/9 |
| 2008/0234915 A1 * | 9/2008 | Nomasa et al. | 701/102 |
| 2009/0260408 A1 * | 10/2009 | Tsukazaki | 70/183 |
| 2009/0309537 A1 * | 12/2009 | Saito | 320/101 |

FOREIGN PATENT DOCUMENTS

| | | |
|---|---|---|
| JP | A-08-093610 | 4/1996 |
| JP | A-11-148387 | 6/1999 |
| JP | A-2000-204996 | 7/2000 |
| JP | A-2003-189411 | 7/2003 |
| JP | A-2003-333705 | 11/2003 |
| JP | A-2005-185055 | 7/2005 |

* cited by examiner

*Primary Examiner* — Thomas Tarcza
*Assistant Examiner* — Nagi Murshed
(74) *Attorney, Agent, or Firm* — Oliff & Berridge, PLC

(57) ABSTRACT

An HV_ECU executes a program including the steps of: determining whether or not an EV switch is turned on until a monitoring timer expires when a system startup switch is turned on, latching the ON state of the EV switch if the EV switch is turned on and confirming an EV mode request on system startup, detecting various state quantities of a vehicle, and starting up a system in an EV mode without starting an engine if an EV mode prohibiting condition is unsatisfied.

11 Claims, 6 Drawing Sheets

F I G. 1
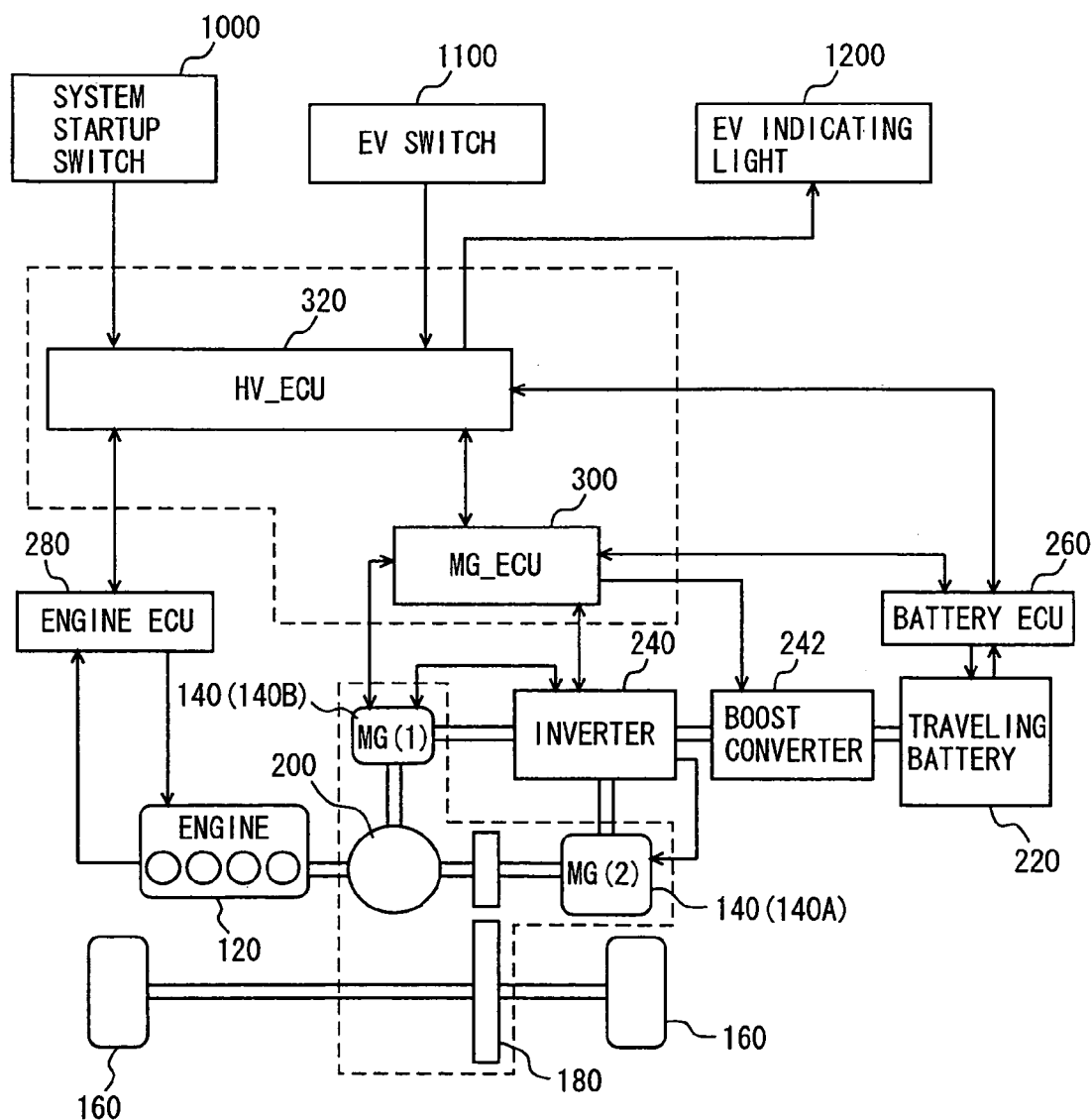

HYBRID CAR CONTROL DEVICE, CONTROL METHOD AND RECORDING MEDIUM FOR RECORDING PROGRAM TO PUT THE CONTROL METHOD INTO PRACTICE

TECHNICAL FIELD

The present invention relates to a hybrid car and particularly to technique of reliably receiving a driver's request that engine should not be started on system startup.

BACKGROUND ART

A hybrid car including an engine actuated by energy on combustion of fuel and an electric motor actuated by electrical energy as power sources for traveling of the vehicle and including an automatic transmission provided between the power sources and driving wheels is in the actual use. In such a hybrid car, by properly using the engine and the electric motor according to a driving state, for example, to travel, it is possible to reduce fuel consumption and an amount of exhaust gas while maintaining predetermined traveling performance. To put it concretely, the hybrid car has a plurality of driving modes with different actuated states of the engine and the electric motor such as an engine traveling mode for traveling while powered by only the engine, a motor traveling mode for traveling while powered by only an electric motor, and an engine plus motor traveling mode for traveling while powered by both the engine and electric motor and automatically switches among these modes according to a predetermined mode switching condition such as a power source map using driving states such as vehicle speed (or power source rotation speed) and an accelerator operated amount as parameters.

Some of such hybrid cars have an EV drive mode (hereafter the EV drive mode and an EV mode will not be distinguished from each other) in which a driver can push a selecting switch (referred to as an EV drive mode switch or an EV switch, for example) to restrict actuation of the engine and achieve traveling by only the motor in order to reduce noise in a midnight or early-morning residential area or reduce exhaust gas in a garage. However, if catalyst temperature of the engine, vehicle interior temperature, or HV battery temperature is low, if a heater or a defroster is used when temperature of engine cooling water is low, or if SOC (State of Charge) of an HV battery is low, it is impossible to execute the EV drive mode.

A hybrid car control device disclosed in Japanese Patent Laying-Open No. 2000-204996 includes an engine and a motor for transmitting power to wheels, a plurality of modes for driving at least one of the engine and the motor can be set and one of the modes is selected based on predetermined conditions. The hybrid car control device has an engine control unit for selecting a mode for prohibiting or restricting starting of the engine in a situation, irrespective of the predetermined conditions, where starting of the engine in the stopped state is not desirable.

With this hybrid car control device, the mode for prohibiting or restricting starting of the engine is selected irrespective of the predetermined conditions in the situation where starting of the engine in the stopped state is not desirable. In other words, the mode selection reflects a driver's will.

However, even with the above-described hybrid car control device disclosed in Japanese Patent Laying-Open No. 2000-204996, the following problems may occur.

In normal cases, it is possible to select the mode for prohibiting or restricting starting of the engine after completion of system startup of the hybrid car. If a time interval between the system startup and starting of the engine is as long as a certain period (e.g., 10 seconds), the driver can avoid starting of the engine by pushing the EV switch during the time period. However, a condition for starting the engine is satisfied (e.g., avoidance of a shock of the engine starting and warming up of the engine catalyst) immediately after the system startup, the engine may be started immediately after the system startup. In such a case, the engine is started against the driver's request to avoid starting of the engine. This occurs when the system is started up in the hybrid car with the non-operating system in the above-described midnight or early-morning residential area. Even though a system startup switch (referred to as a start (ST) switch or a power switch) is pushed and the EV switch is pushed, the request for the EV traveling is recognized by an ECU (Electronic Control Unit) only after satisfaction of the engine starting condition and the engine is started immediately after the system startup.

DISCLOSURE OF THE INVENTION

The present invention has been made to solve the above-described problems and it is an object of the invention to provide a hybrid car control device and a control method for reliably receiving a driver's request when a driver does not desire starting of an engine on system startup and for avoiding starting of the engine at the request and a recording medium for recording a program to put the control method into practice on a computer.

A control device according to the invention controls a hybrid car traveling while powered by an engine and a power source other than the engine. The hybrid car includes a first switch to be operated by a driver so as to start up a hybrid system and a second switch to be operated by the driver so as not to actuate the engine. The control device includes: a first detecting unit detecting whether or not the first switch is operated; a second detecting unit detecting whether or not the second switch is operated; a control unit executing startup processing of the hybrid system in response to operation of the first switch; and a detecting unit detecting a request of the driver to execute the startup processing without actuating the engine in at least one of a case where the first switch and the second switch are operated substantially simultaneously and a case where the second switch is operated prior to operation of the first switch.

With this invention, it is possible to detect the request of the driver to execute the startup processing without actuating the engine in at least one of the case where the first switch (e.g., a system startup switch) for starting up the hybrid system and the second switch for avoiding actuation of the engine are operated substantially simultaneously and a case where the second switch is operated prior to operation of the first switch. In this way, it is possible to reliably detect the request of the driver to start up the system of the hybrid vehicle without actuating the engine. As a result, it is possible to provide the control device of the hybrid car for reliably receiving the driver's request when the driver does not desire starting of the engine on system startup.

The control unit preferably executes the startup processing without actuating the engine in a case where the request of the driver is detected.

With this invention, the system of the hybrid car is started up without actuating the engine when the request of the driver to execute the startup processing without actuating the engine is detected. Therefore, it is possible to reliably comply with the driver's request to avoid engine starting in the system startup processing.

Furthermore, the control unit preferably executes the startup processing without actuating the engine when a state of the hybrid car satisfies a condition for not requesting starting of the engine in a case where the driver's request is detected.

With this invention, it is possible to start up the system of the hybrid car without actuating the engine when the driver's request to execute the startup processing without actuating the engine is detected and when the condition for not starting the engine is satisfied.

Moreover, the control device preferably includes also a holding unit holding an operated state of a momentary switch that is the second switch and that outputs, only when it is operated, a signal corresponding to the operation.

With this invention, because the state of the second switch is held, i.e., the operated state of the second switch is held immediately after actuation starting timing of the control device by the startup processing of the hybrid system, it is possible to reliably detect the driver's request to avoid the engine starting by operation of the second switch.

Furthermore, the second detecting unit preferably detects whether or not the second switch is operated for a predetermined time after the operation of the first switch.

With this invention, the state of operation of the second switch is detected for the predetermined time after the first switch is operated to start actuation of the control device by the startup processing of the hybrid system. Therefore, even if the first switch and the second switch are operated substantially simultaneously, it is possible to reliably detect operation of the second switch.

Moreover, the second switch is preferably an alternate switch having a mechanical self-holding mechanism.

With this invention, because the second switch has the mechanical self-holding mechanism, it is possible to detect the state of the second switch operated before the operation of the first switch and starting of actuation of the control device by the startup processing of the hybrid system. Therefore, it is possible to reliably detect the operation of the second switch in any of the case where the first switch and the second switch are operated substantially simultaneously and the case where the second switch is operated prior to the operation of the first switch.

BRIEF DESCRIPTION OF THE DRAWINGS

FIG. 1 is a control block diagram of an overall hybrid car including a control device according to an embodiment of the present invention.

BEST MODES FOR CARRYING OUT THE INVENTION

Figure 2:
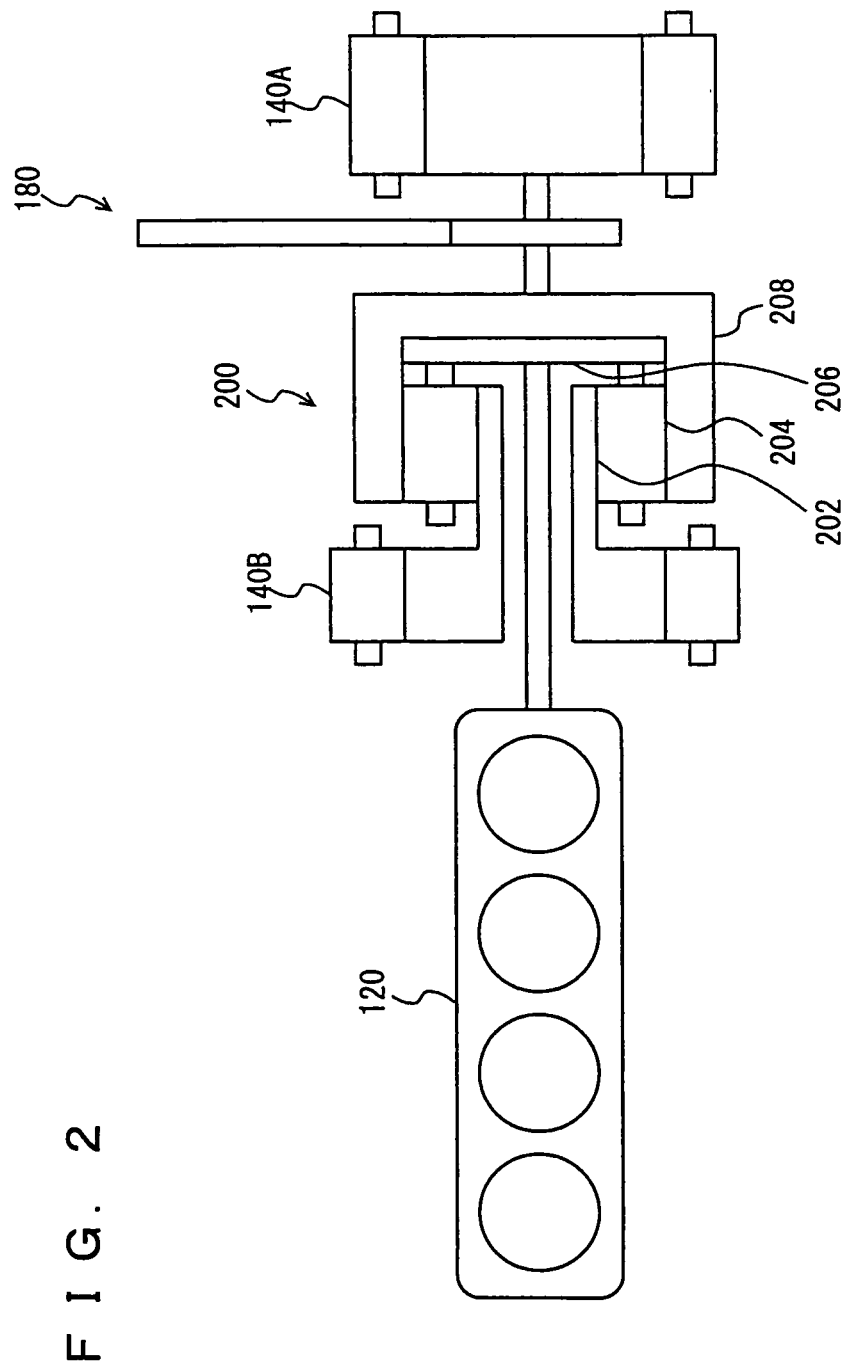
FIG. 2 is a drawing showing a power split device.

An embodiment of the present invention will be described below with reference to the drawings. In the following description, identical parts will be provided with identical reference numerals. They have the same names and functions. Therefore, they will not be described repeatedly in detail.

With reference to FIG. 1, a control block diagram of an overall hybrid car including a control device according to the embodiment of the invention will be described. The invention is not limited to the hybrid car shown in FIG. 1. In the invention, it is essential only that an internal combustion engine (hereafter described as an engine) such as a gasoline engine as a power source be a drive source for causing the vehicle to travel and be a drive source for a generator. Moreover, a vehicle that has the engine and a motor generator as the drive sources and that can travel while powered by the motor generator (when engine is non-operating and operating) suffices. The vehicle may be other types of hybrid cars mounted with a battery for traveling (not limited to a so-called series-type or parallel-type hybrid car). The battery may be a nickel hydride battery, a lithium-ion battery, or the like and is not limited to a specific type of battery. Furthermore, a capacitor may be used instead of the battery.

The hybrid car includes engine 120 and motor generators (MG) 140. In the following, motor generators 140 will be expressed as motor generator 140A (or MG(2) 140A) and motor generator 140B (or MG(1) 140B) for convenience of explanation, though motor generator 140A functions as a generator or motor generator 140B functions as a motor depending on a traveling state of the hybrid car. When the motor generator functions as the generator, regenerative braking is carried out. When the motor generator functions as the generator, kinetic energy of the vehicle is converted into electric energy to decelerate the vehicle.

The hybrid car also includes: a speed reducer 180 for transmitting power generated by engine 120 or motor generators 140 to driving wheels 160 or for transmitting driving of driving wheels 160 to engine 120 or motor generators 140; a power split device (e.g., a planetary gear mechanism that will be described later) 200 for dividing power generated by engine 120 between two routes to driving wheels 160 and motor generator 140B (MG(1) 140B); a traveling battery 220 to be charged to drive motor generators 140; an inverter 240 for carrying out current control while converting direct current of traveling battery 220 and alternating current of motor generators 140 (MG(2) 140A) and motor generator 140B (MG(1) 140B); a battery control unit (hereafter referred to as battery ECU (Electronic Control Unit) 260 for managing and controlling states of charge and discharge (e.g., SOC (State Of Charge)) of traveling battery 220; an engine ECU 280 for controlling operating state of engine 120; an MG_ECU 300 for controlling motor generators 140, battery ECU 260, inverter 240, and the like depending on a state of the hybrid car; and an HV_ECU 320 for mutually managing and controlling battery ECU 260, engine ECU 280, and MG_ECU 300 to control an overall hybrid system so that the hybrid car can travel with the highest efficiency.

Moreover, a startup request signal is input to HV_ECU 320 from a system startup switch 1000 to which a driver inputs a request for startup of a main system of the hybrid car. More specifically, the signal from system startup switch 1000 is input to a power supply ECU provided separately, power supply ECU brings a main relay of the system into conduction, electric power is also supplied to HV_ECU 320, and HV_ECU 320 can detect the startup request signal from system startup switch 1000. Furthermore, an EV traveling request signal from an EV switch 1100 operated by the driver of the hybrid car and for requesting an EV traveling mode for traveling without starting engine 120 is input to HV_ECU 320. HV_ECU 320 outputs control signals for turning on and off an EV indicating light 1200. HV_ECU 320 turns on EV indicating light 1200 when it receives the request for the EV traveling mode or during execution of the EV traveling mode and turns off EV indicating light 1200 in other cases.

In the present embodiment, a boost converter 242 is provided between traveling battery 220 and inverter 240. Because rated voltage of traveling battery 220 is lower than rated voltages of motor 140A (MG(2) 140A) and motor generator 140B (MG(1) 140B), voltage of electric power is boosted by boost converter 242 to supply the electric power from traveling battery 220 to motor generator 140A (MG(2) 140A) and motor generator 140B (MG(1) 140B).

Although the respective ECUs are provided as separate structures in FIG. 1, two or more ECUs may be combined into one ECU (e.g., MG_ECU 300 and HV_ECU 320 may be combined into one ECU as shown by a dotted line in FIG. 1).

For power split device 200, a planetary gear mechanism (planetary gear) is used to distribute the power of engine 120 between both driving wheels 160 and motor generator 140B (MG(1) 140B). By controlling a rotation speed of motor generator 140B (MG(1) 140B), power split device 200 also functions as a continuously variable transmission. Rotational force of engine 120 is input to a carrier (C) and transmitted to motor generator 140B (MG(1) 140B) by a sun gear (S) and to motor generator 140A (MG(2) 140A) and an output shaft (driving wheels 160) by a ring gear (R). To stop rotating engine 120, kinetic energy of the rotation is converted into electrical energy by motor generator 140B (MG(1) 140B) to reduce speed of engine 120 because engine 120 is rotating.

In the hybrid car mounted with the hybrid system shown in FIG. 1, if a predetermined condition of the vehicle state is satisfied, HV_ECU 320 controls engine 120 through motor generator 140A (MG(2) 140A) and engine ECU 280 so that traveling of the hybrid car is carried out by only motor generator 140A (MG(2) 140A) of motor generators 140. For example, the predetermined condition is that SOC of traveling battery 220 is greater than or equal to a predetermined value. In this way, when efficiency of engine 120 is low at startup or during low-speed traveling, traveling of the hybrid car can be carried out by only motor generator 140A (MG(2) 140A). As a result, it is possible to reduce SOC of traveling battery 220 (and then traveling battery 220 can be charged when the vehicle is parked).

During normal traveling, power split device 200 divides the power of engine 120 between two routes to directly drive driving wheels 160 via one route and drive motor generator 140B (MG(1) 140B) to generate electricity via the other route. At this time, the generated electric power drives motor generator 140A (MG(2) 140A) to assist driving of driving wheels 160. During high-speed traveling, electric power from traveling battery 220 is further supplied to motor generator 140A (MG(2) 140A) to increase output of motor generator 140A (MG(2) 140A) to thereby add driving force to driving wheels 160. During deceleration, on the other hand, motor generator 140A (MG(2) 140A) driven by driving wheels 160 functions as the generator to carry out regenerative electric power generation and the recovered electric power is stored in traveling battery 220. When an amount of charge of traveling battery 220 has reduced and especially requires charging, output of engine 120 is increased to increase electricity generated by motor generator 140B (MG(1) 140B) to thereby increase the amount of charge of traveling battery 220.

A target SOC of traveling battery 220 is normally set to about 60% so that energy can be recovered whenever the regeneration is carried out. An upper limit and a lower limit of the SOC are set to 80% and 30%, respectively, for example, to suppress deterioration of traveling battery 220 and HV_ECU 320 controls electric power generation, regeneration, motor outputs by motor generators 140 through MG_ECU 300 so that the SOC is kept between the upper and lower limits. The values mentioned here are merely examples and there is no special restriction.

With reference to FIG. 2, power split device 200 will be further described. Power split device 200 is formed of the planetary gear including sun gear (S) 202 (hereafter simply referred to as sun gear 202), a pinion gear 204, carrier (C) 206 (hereafter simply referred to as carrier 206), and ring gear (R) 208 (hereafter simply referred to as ring gear 208).

Pinion gear 204 is engaged with sun gear 202 and ring gear 208. Carrier 206 supports pinion gear 204 so that pinion gear 204 can rotate. Sun gear 202 is coupled to a rotation shaft of MG(1) 140B. Carrier 206 is coupled to a crankshaft of engine 120. Ring gear 208 is coupled to a rotation shaft of MG(2) 140A and speed reducer 180.

Because engine 120, MG(1) 140B, and MG(2) 140A are coupled by power split device 200 formed of the planetary gear, the speed of engine 120 and rotation speeds of MG(1) 140B and MG(2) 140A are connected by a straight line on an alignment chart.

HV_ECU 320 that is the control device according to the embodiment starts up the system in the EV traveling mode without starting engine 120 if EV switch 1100 is pushed when the system startup is requested by the driver by using system startup switch 1000 and HV_ECU 320 starts operating.

Figure 3:
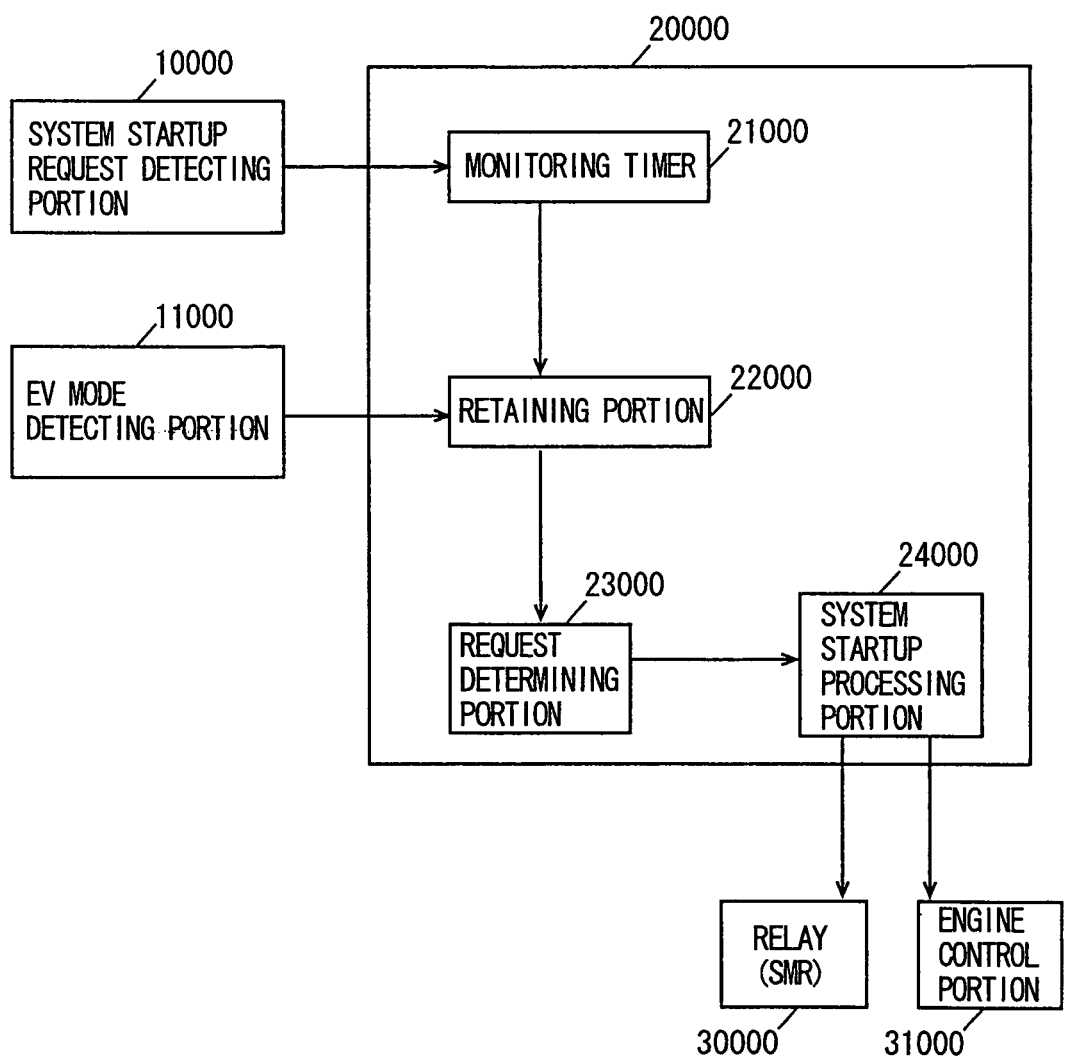
FIG. 3 is a functional block diagram of the control device according to the embodiment of the invention.

With reference to FIG. 3, a functional block diagram of the control device according to the embodiment will be described. With reference to FIG. 3, the control device includes a system startup request detecting portion 10000 for detecting a system startup request by the driver to start up the system of the hybrid car, an EV mode detecting portion 11000 for detecting an EV traveling request by the driver to cause the hybrid car to travel by using the motor generators without actuating engine 120, a control portion 20000, a relay 30000 such as an SMR (System Main Relay) connected to control portion 20000, and an engine control portion 31000 (corresponding to engine ECU 280 in FIG. 1) for controlling engine 120.

Control portion 20000 includes a monitoring timer 21000 connected to system startup request detecting portion 10000, a retaining portion 22000 connected to EV mode detecting portion 11000, a request determining portion 23000 connected to retaining portion 22000, and a system startup processing portion 24000 connected to request determining portion 23000.

Monitoring timer 21000 is used to detect the EV traveling request until a preset time passes since detection of the system startup request. If EV mode detecting portion 11000 detects the EV traveling request before the time set in monitoring timer 21000 passes, retaining portion 22000 retains the EV traveling request. Based on the system startup request and the retained EV traveling request, if the system startup request in the EV mode is present or absent is determined. Request determining portion 23000 determines that the driver is requesting execution of the system startup processing without actuation of engine 120 (1) when the system startup request detected by system startup request detecting portion 10000 and the EV traveling request detected by EV mode detecting portion 11000 are detected substantially simultaneously (the switches are operated substantially simultaneously) or (2) when the EV traveling request detected by EV mode detecting portion 11000 is detected prior to the system startup request detected by system startup request detecting portion 10000.

Request determining portion 23000 issues a command to system startup processing portion 24000 to perform the system startup according to the request of the driver. System startup processing portion 24000 outputs control signals to relay 30000 such as the SMR and engine control portion 31000 to start up the system of the hybrid car.

Control portion 20000 in the functional block shown in FIG. 3 can be implemented in forms of both hardware and software, the hardware formed mainly of digital circuits or analog circuits and software formed mainly of a CPU included in HV_ECU 320, memory, and a program read out from the memory and executed by the CPU. In general, implementation in the form of hardware is said to be advantageous in operation speed and implementation in the form of software is said to be advantageous in design change. In the following, implementation of the control device in the form of software will be described. A recording medium recording such a program is an aspect of the invention.

Figure 4:
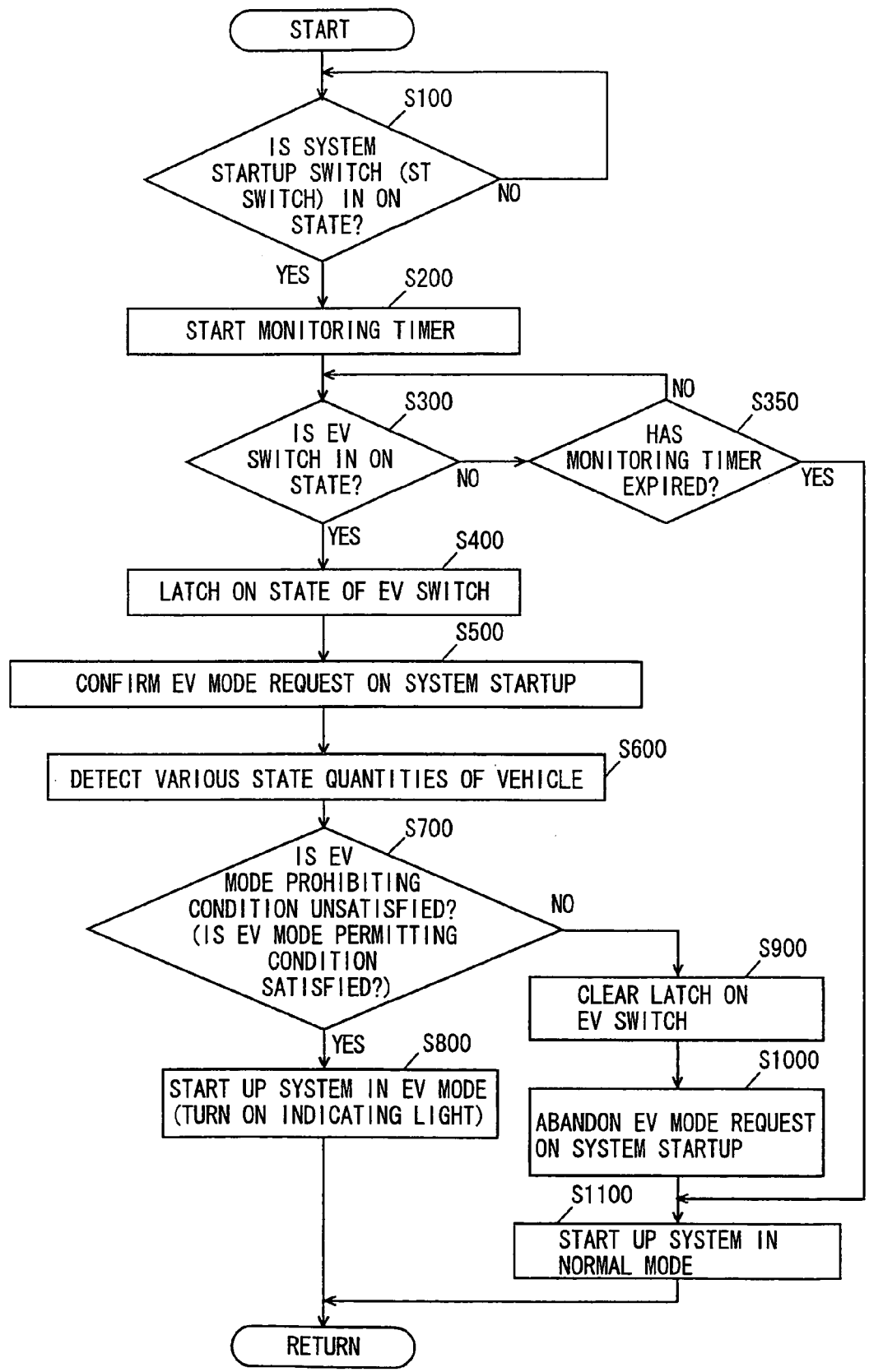
FIG. 4 is a flow chart showing a control structure of a program executed by an HV_ECU that is the control device according to the embodiment of the invention.

With reference to FIG. 4, a control structure of the program executed by HV_ECU 320 will be described. The program is executed repeatedly at a preset cycle time. The flow chart shown in FIG. 4 shows processing ending with completion of the system startup of the hybrid car assuming that operation of HV_ECU 320 has been started by power supply ECU that received input from the system startup switch.

In step (hereafter "step" will be referred to as "S") 100, HV_ECU 320 determines whether or not system startup switch (ST switch) 1000 has been turned on. At this time, electric power is supplied to HV_ECU 320 due to actuation of power supply ECU and HV_ECU 320 can detect a state (ON/OFF) of the signal input from system startup switch 1000. If system startup switch 1000 is in an ON state (YES in S100), the processing goes to S200. If not (NO in S100), the processing returns to S100.

In S200, HV_ECU 320 starts the monitoring timer. In S300, HV_ECU 320 determines whether or not EV switch 1100 is in an ON state. If EV switch 1100 is in the ON state (YES in S300), the processing goes to S400. If not (NO in S300), the processing goes to S350.

In S350, HV_ECU 320 determines whether or not the monitoring timer that started counting after system startup switch 1000 was turned on has expired. Time set at the monitoring timer is set properly. For example, the driver who pushes system startup switch 1000 sets the time based on time required to push EV switch 1100. If the monitoring timer expires (YES in S350), the processing goes to S1100. If not (NO in S350), the processing returns to S300.

By providing such a monitoring timer, it is possible to monitor the state of EV switch 1100 for the predetermined monitoring time (e.g., between several hundreds milliseconds and several seconds) and to repeatedly determine the state of EV switch 1100 until the monitoring timer expires. If the monitoring timer has never detected the ON state of EV switch 1100 before expiration, it is determined that EV switch 1100 has not been pushed by the driver. In this way, it is possible to detect the ON state of EV switch 1100 even if system startup switch 1000 and EV switch 1100 have been pushed substantially simultaneously and the timing of the substantial simultaneity is uncertain. In the invention, provision of such a monitoring timer is not an absolute necessity.

In S400, HV_ECU 320 latches the ON state of EV switch 1100. In S500, HV_ECU 320 confirms the EV mode request on system startup.

In S600, HV_ECU 320 detects various state quantities of the vehicle. For example, the state quantities are catalyst temperature of engine 120, vehicle interior temperature, temperature of traveling battery 220, temperature of cooling water for engine 120, a use state of a heater or a defroster, the SOC of traveling battery 220, and the like. These state quantities are for determining whether or not the EV drive mode can be executed.

In S700, HV_ECU 320 determines whether an EV mode prohibiting condition is unsatisfied based on the various state quantities of the vehicle. This is synonymous with determination of whether the EV mode permitting condition is satisfied. If EV mode prohibiting condition is unsatisfied (YES in S700), the processing goes to S800. If not (NO in S700), the processing goes to S900. The EV mode prohibiting condition (EV mode permitting condition) in S700 is set properly. To permit the system startup in the EV mode to a maximum extent, an easy condition is set.

In S800, HV_ECU 320 starts up the system in the EV mode. In other words, HV_ECU 320 starts up the system of the hybrid car without starting engine 120. Furthermore, HV_ECU 320 turns on EV indicating light 1200. In this way, the driver can recognize that the EV mode request on the system startup has been received. Then, the processing ends.

In S900, HV_ECU 320 clears the latch on EV switch 1100. In S1000, HV_ECU 320 abandons the EV mode request on the system startup. In this way, the driver can recognize that the EV mode prohibiting condition is satisfied, though the EV mode request on the system startup has been received.

In S1100, HV_ECU 320 starts up the system in a normal mode that is not the EV mode. In other words, HV_ECU 320 starts engine 120 and starts up the system of the hybrid car. Then, the processing ends.

Operation of HV_ECU 320 that is the control device according to the embodiment based on the above structure and flow chart will be described.

If system startup switch 1000 is pushed (YES in S100) in the hybrid car with the non-operating system, the monitoring timer starts (S200). For the monitoring time of several hundreds milliseconds to several seconds until the monitoring timer expires, whether or not EV switch 1100 is in the ON state is determined (S300).

If the driver pushes EV switch 1100 during the monitoring time (YES in S300), HV_ECU 320 latches the ON state of EV switch 1100 (S400). The EV mode request on the system startup is confirmed (S500).

If it is determined that the EV mode prohibiting condition is unsatisfied based on the various state quantities of the vehicle (YES in S700), the system of the hybrid car is started up without starting engine 120. At this time, EV indicating light 1200 is turned on and the driver can recognize that the EV mode request on the system startup has been received (S800).

On the other hand, if it is determined that the EV mode prohibiting condition is not unsatisfied based on the various condition quantities of the vehicle (NO in S700), the latch on EV switch 1100 is cleared (S900). Furthermore, the EV mode request on the system startup is abandoned (S1000). Then, engine 120 is started in the normal mode and the system of the hybrid car is started up (S1100).

As described above, with the control device according to the embodiment, it is possible to reliably detect the driver's system startup request in the EV mode in both of the case where the system startup switch and the EV switch have been pushed simultaneously and the case where the switches have been pushed substantially simultaneously.

It is also possible to eliminate processing in S600 and S700 in the flow chart in FIG. 4. In this case, it is possible to necessarily start up the system in the EV mode when the EV mode is requested on the system startup.

Moreover, even in such a case, it is also preferable to start up the system in the EV mode except when a condition that makes the EV traveling impossible is satisfied (when the EV traveling cannot be carried out even if the EV mode is requested on the system startup and the system is started up without starting the engine). The EV mode prohibiting condition in S700 is set to be extremely restricted to execute the system startup in the EV mode to a maximum extent. In other words, in the normal hybrid car, the system can be started up by the system startup switch when a brake pedal is depressed in a P-position. At this time, because the brake pedal is depressed in the P-position, a shock of the engine starting is less likely to occur in the vehicle. Therefore, the engine may be started on the system startup, though the traveling in the EV mode is possible. If the system is set to be started up in the EV mode except when the condition that makes the EV traveling impossible is satisfied, the driver's request for the system startup in the EV mode can take priority over avoidance of vibration of the engine and it is possible to start up the system without starting the engine in a midnight or early-morning residential area.

<Variation>

A variation of the above-described embodiment will be described. In the present variation, the EV switch is different from that in the above-described embodiment and is characterized in that it is a switch having the following mechanical self-holding function.

Figure 5:
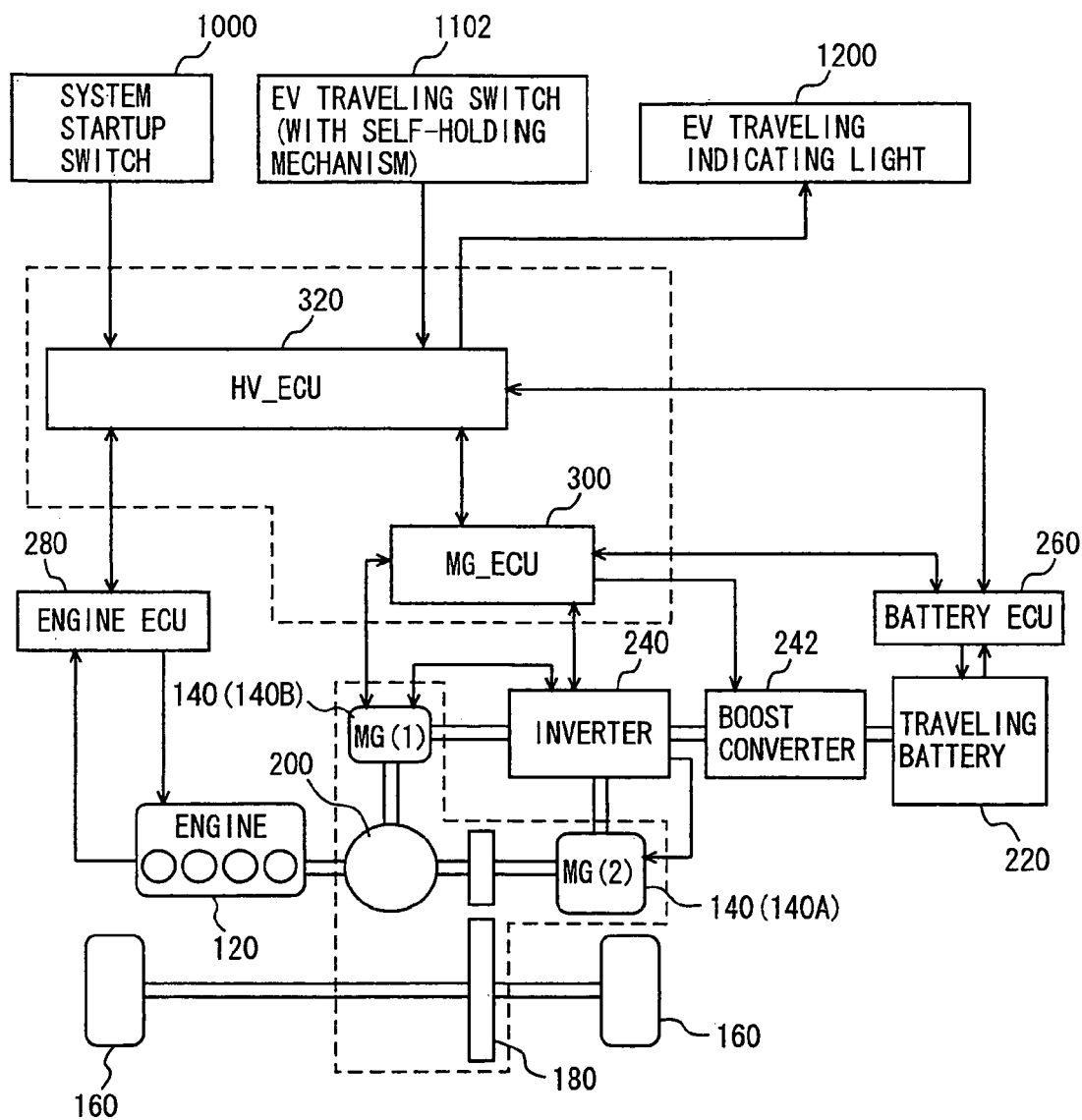
FIG. 5 is a control block diagram of the overall hybrid car including a control device according to a variation of the embodiment of the invention.

FIG. 5 is a control block diagram of the overall hybrid car including a control device according to the variation. FIG. 5 corresponds to FIG. 1 and component parts having the same functions are provided with the same reference numerals. They will not be described repeatedly in detail here.

The variation is different from the above-described embodiment in that it includes EV switch 1102 having the self-holding function instead of EV switch 1100. EV switch 1102 is a so-called alternate or push-lock switch having a mechanical self-holding circuit (the switch that mechanically holds a pushed state when it is pushed for the first time, returns to its original state before the push when it is pushed for the second time, and mechanically holds the pushed state again when it is pushed once more, repeating these operations) or a lever-type selector switch having two contacts (EV/non-EV). With such a switch, there is the following advantage, though HV_ECU 320 cannot electrically latch the ON state of the EV switch, nor can it clear the latch. If EV switch 1102 is pushed before actuation of HV_ECU 320 (when system startup switch 1000 has not been pushed and HV-ECU has not been started up), the switch mechanically holds the ON state. Therefore, HV_ECU 320 that starts operating after that can reliably detect the ON state of EV switch 320.

Figure 6:
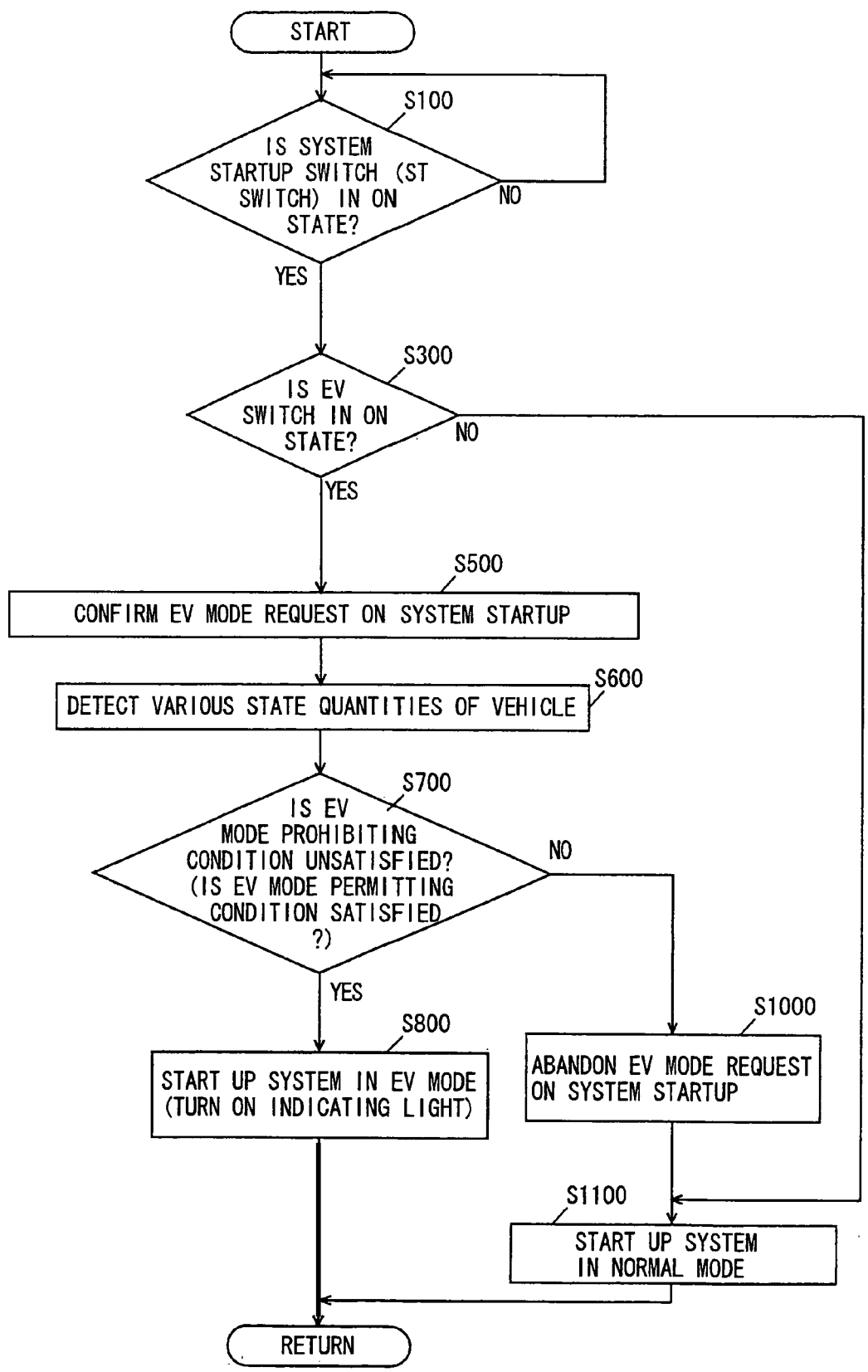
FIG. 6 is a flow chart showing a control structure of a program executed by an HV_ECU that is the control device according to the variation of the embodiment of the invention.

With reference to FIG. 6, a control structure of a program executed by HV_ECU 320 will be described. In the flow chart shown in FIG. 6, only a part of processing in the flow chart in FIG. 4 is executed.

With reference to FIG. 6, the variation does not include the items of processing in S200, S350, S400, and S900 in FIG. 4.

According to the variation, the ON state of EV switch 1102 is mechanically held when EV switch 1102 is pushed even before system startup switch 1000 is pushed. If system startup switch 1000 is pushed in this state (YES in S100), it is determined that EV switch 1102 is in the ON state because EV switch 1102 is held in the ON state (S300).

If it is determined that the EV mode prohibiting condition is unsatisfied based on the various state quantities of the vehicle (YES in S700), the system of the hybrid car is started up without starting engine 120. At this time, EV indicating light 1200 is turned on and the driver can recognize that the EV mode request on the system startup has been received (S800).

On the other hand, if it is determined that the EV mode prohibiting condition is not unsatisfied based on the various state quantities of the vehicle (NO in S700), the EV mode request on the system startup is abandoned (S1000). Then, engine 120 is started in the normal mode and the system of the hybrid car is started up (S1100).

At this time, self-holding of S1102 having the mechanical self-holding mechanism cannot be cleared by HV_ECU 320. However, the driver can recognize that the EV mode permitting condition has not been satisfied while the EV traveling request was received, based on a fact that EV indicating light 1200 is not turned on. At this time, the driver can push EV switch 1102 to clear the self-holding.

As described above, with the variation, it is possible to reliably detect the driver's system startup request in the EV mode in any of the case where the system startup switch and the EV switch have been pushed simultaneously, the case where the switches have been pushed substantially simultaneously, and the case where the EV switch has been pushed first.

The embodiment disclosed this time is an example in all points and should not be considered restrictive. The scope of the invention is not defined in the above description but is defined in claims and includes meanings equivalent to the claims and all modifications in the scope of claims.

The invention claimed is:

1. A control device for a hybrid car traveling while powered by an engine and a power source other than the engine, the hybrid car including a first switch to be operated by a driver so as to start up a hybrid system and a second switch to be operated by the driver so as not to actuate said engine and said control device comprising:
a first detecting unit detecting whether or not said first switch is operated;
a second detecting unit detecting whether or not said second switch is operated;
a control unit executing startup processing of the hybrid system in response to operation of said first switch and without actuating said engine when a state of said hybrid car satisfies a condition for not requesting starting of said engine in a case where said request is detected; and
a detecting unit detecting a request of said driver to execute said startup processing without actuating said engine in at least one of a case where said first switch and said second switch are operated substantially simultaneously and a case where said second switch is operated prior to operation of the first switch.

2. The control device for the hybrid car according to claim 1, wherein said control unit executes said startup processing without actuating said engine in a case where said request is detected.

3. The control device for the hybrid car according to claim 1, wherein said second switch is a momentary switch for outputting, only when it is operated, a signal corresponding to said operation and said control device further includes a holding unit holding an operated state of said second switch.

4. The control device for the hybrid car according to claim 3, wherein said second detecting unit detects whether or not said second switch is operated for a predetermined time after the operation of said first switch.

5. The control device for the hybrid car according to claim 1, wherein said second switch is an alternate switch having a mechanical self-holding mechanism.

6. A control method for a hybrid car traveling while powered by an engine and a power source other than the engine, the hybrid car including a first switch to be operated by a driver so as to start up a hybrid system and a second switch to be operated by the driver so as not to actuate said engine and said control method including the steps of:
    detecting whether or not said first switch is operated;
    detecting whether or not said second switch is operated;
    executing startup processing of the hybrid system in response to operation of said first switch and without actuating said engine when a state of said hybrid car satisfies a condition for not requesting starting of said engine in a case where said request is detected; and
    detecting a request of said driver to execute said startup processing without actuating said engine in at least one of a case where said first switch and said second switch are operated substantially simultaneously and a case where said second switch is operated prior to operation of the first switch.

7. The control method for the hybrid car according to claim 6, wherein said step of executing said startup processing executes said startup processing without actuating said engine in a case where said request is detected.

8. The control method for the hybrid car according claim 6, wherein said second switch is a momentary switch for outputting, only when it is operated, a signal corresponding to said operation and said control method further includes a step of holding an operated state of said second switch.

9. The control method for the hybrid car according to claim 8, wherein said step of detecting whether or not said second switch is operated detects whether or not said second switch is operated for a predetermined time after the operation of said first switch.

10. The control method for the hybrid car according to claim 6, wherein said second switch is an alternate switch having a mechanical self-holding mechanism.

11. A recording medium for recording a program to put the control method according to claim 6 into practice on a computer.

* * * * *

UNITED STATES PATENT AND TRADEMARK OFFICE
CERTIFICATE OF CORRECTION

| | | |
|---|---|---|
| PATENT NO. | : 8,437,896 B2 | |
| APPLICATION NO. | : 12/310783 | |
| DATED | : May 7, 2013 | |
| INVENTOR(S) | : Keiji Kaita et al. | |

It is certified that error appears in the above-identified patent and that said Letters Patent is hereby corrected as shown below:

In the Claims

Column 10 lines 31 thru Column 12 line 18 should read

1.    A control device for a hybrid car traveling while powered by an engine and a power source other than the engine, the hybrid car including a first switch to be operated by a driver so as to start up a hybrid system and a second switch to be operated by the driver so as not to actuate said engine and said control device comprising:

a first detecting unit detecting whether or not said first switch is operated;

a second detecting unit detecting whether or not said second switch is operated for a predetermined time after the operation of said first switch; and a control unit executing startup processing of the hybrid system in response to operation of said first switch; wherein said second detecting unit determines a request given by said second switch from said driver; and said control unit determines whether or not said engine is to be operated based on said request determined by said second detecting unit.

2.    The control device for the hybrid car according to claim 1, wherein said control unit Signed and Sealed this
Eleventh Day of March, 2014

Michelle K. Lee
*Deputy Director of the United States Patent and Trademark Office* executes said startup processing without actuating said engine in a case where said request is detected.

3. The control device for the hybrid car according to claim 1, wherein said control unit executes said startup processing without actuating said engine when a state of said hybrid car satisfies a condition for not requesting starting of said engine in a case where said request is detected.

4. The control device for the hybrid car according to claim 1, wherein said second switch is a momentary switch for outputting, only when it is operated, a signal corresponding to said operation and said control device further includes a holding unit holding an operated state of said second switch.

5. A control method for a hybrid car traveling while powered by an engine and a power source other than the engine, the hybrid car including a first switch to be operated by a driver so as to start up a hybrid system and a second switch to be operated by the driver so as not to actuate said engine and said control method including the steps of:

detecting whether or not said first switch is operated;

detecting whether or not said second switch is operated for a predetermined time after the operation of said first switch; and executing startup processing of the hybrid system in response to operation of said first switch; wherein said step of detecting whether or not said second switch is operated determines a request given by said second switch from said driver, and said step of executing startup processing determines whether or not said engine is to be operated based on said request determined by said second detecting unit.

6. The control method for the hybrid car according to claim 5, wherein said step of executing said startup processing executes said startup processing without actuating said engine in a case where said request is detected.

7. The control method for the hybrid car according to claim 5, wherein said step of executing said startup processing executes said startup processing without actuating said engine when a state of said hybrid car satisfies a condition for not requesting starting of said engine in a case where said request is detected.

8. The control method for the hybrid car according claim 5, wherein said second switch is a momentary switch for outputting, only when it is operated, a signal corresponding to said operation and said control method further includes a step of holding an operated state of said second switch.

9. A recording medium for recording a program to put the control method according to claim 5 into practice on a computer.